(12) United States Patent
Ubik et al.

(10) Patent No.: US 8,700,252 B2
(45) Date of Patent: Apr. 15, 2014

(54) APPARATUS, METHODS, AND SYSTEMS FOR TESTING CONNECTED SERVICES IN A VEHICLE

(75) Inventors: Henry Thomas Ubik, Grosse Pointe Park, MI (US); Patrick Joseph Dwan, Canton, MI (US); David M. DiMeo, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 620 days.

(21) Appl. No.: 12/844,409

(22) Filed: Jul. 27, 2010

(65) Prior Publication Data

US 2012/0029762 A1 Feb. 2, 2012

(51) Int. Cl.
*G01M 17/00* (2006.01)
(52) U.S. Cl.
USPC .................................................. 701/29.1
(58) Field of Classification Search
USPC .................................................. 701/29.1
See application file for complete search history.

(56) References Cited

U.S. PATENT DOCUMENTS

| | | | |
|---|---|---|---|
| 5,781,125 A | 7/1998 | Godau et al. | |
| 5,922,041 A | 7/1999 | Anderson | |
| 6,064,322 A | 5/2000 | Ohira | |
| 6,337,621 B1 | 1/2002 | Ogino et al. | |
| 6,356,839 B1 | 3/2002 | Monde et al. | |
| 6,434,455 B1 | 8/2002 | Snow et al. | |
| 6,553,292 B2 | 4/2003 | Kokes et al. | |
| 6,598,183 B1 | 7/2003 | Grieco et al. | |
| 6,603,394 B2 | 8/2003 | Raichle et al. | |
| 6,611,740 B2 | 8/2003 | Lowrey et al. | |
| 6,636,790 B1 | 10/2003 | Lightner et al. | |
| 6,687,587 B2 | 2/2004 | Kacel | |
| 6,738,697 B2 | 5/2004 | Breed | |
| 6,778,888 B2 | 8/2004 | Cataldo et al. | |
| 6,978,198 B2 | 12/2005 | Shi | |
| 7,146,307 B2 | 12/2006 | Mocek | |
| 7,155,321 B2 | 12/2006 | Bromley et al. | |
| 7,209,490 B2 | 4/2007 | Isaac et al. | |

(Continued)

FOREIGN PATENT DOCUMENTS

| | | |
|---|---|---|
| EP | 0808492 | 8/1996 |
| JP | 9264819 A | 10/1997 |
| JP | 11326140 A | 11/1999 |
| JP | 2006018680 A | 1/2006 |

OTHER PUBLICATIONS

K. Whitfield, A hitchhiker's Guide to the Telematics Ecosystem, Automotive Design & Production, Oct. 2003, printed from http://findarticles.com/p/articles/mi_m0KJI/is_10_115/ai_n6010894/?tag=content;col1 on Aug. 4, 2009.

(Continued)

*Primary Examiner* — Hussein A. Elchanti
(74) *Attorney, Agent, or Firm* — Jennifer M. Stec; Brooks Kushman P.C.

(57) ABSTRACT

Various embodiments include tools and methods for diagnosing connected services in a vehicle. Communication with a vehicle computing system in a vehicle may be established. A diagnostic connection to a diagnostics server may also be established. Vehicle information and diagnostic data from one or more connected services may be received from the vehicle computing system and transmitted via a diagnostic connection to the diagnostics server. A connected services diagnostic status for the vehicle may be determined based on the vehicle information and the diagnostic data. The connected services diagnostic status may be received from the server and output to a user.

20 Claims, 4 Drawing Sheets

(56) References Cited

U.S. PATENT DOCUMENTS

| | | |
|---|---|---|
| 7,228,211 B1 | 6/2007 | Lowrey et al. |
| 7,232,962 B2 | 6/2007 | Rynd |
| 7,277,780 B2 | 10/2007 | Meier-Arendt et al. |
| 7,340,365 B2 | 3/2008 | Wubbena et al. |
| 7,343,526 B2 | 3/2008 | Aditham |
| 7,356,394 B2 | 4/2008 | Burgess |
| 7,366,934 B1 | 4/2008 | Narayan et al. |
| 7,379,541 B2 | 5/2008 | Iggulden et al. |
| 7,487,074 B2 | 2/2009 | Ohtsu et al. |
| 7,493,209 B1 | 2/2009 | Altrichter et al. |
| 7,522,995 B2 | 4/2009 | Nortrup |
| 7,532,962 B1 | 5/2009 | Lowrey et al. |
| 7,590,476 B2 | 9/2009 | Shumate |
| 7,905,815 B2 | 3/2011 | Ellis et al. |
| 7,983,839 B2 | 7/2011 | Sutardja |
| 8,024,111 B1 | 9/2011 | Meadows et al. |
| 8,103,443 B2 | 1/2012 | Kantarjiev et al. |
| 8,126,644 B2 | 2/2012 | Amano |
| 8,140,358 B1 | 3/2012 | Ling et al. |
| 8,185,299 B2 | 5/2012 | Fujiwara et al. |
| 8,219,249 B2 | 7/2012 | Harrod et al. |
| 8,285,439 B2 | 10/2012 | Hodges |
| 8,315,802 B2 | 11/2012 | Brown |
| 8,364,402 B2 | 1/2013 | Ross et al. |
| 8,390,473 B2 | 3/2013 | Krzyzanowski et al. |
| 8,392,105 B2 | 3/2013 | Desborough |
| 2002/0035429 A1 | 3/2002 | Banas |
| 2002/0173885 A1 | 11/2002 | Lowrey et al. |
| 2003/0034769 A1 | 2/2003 | Lipscomb |
| 2003/0036832 A1 | 2/2003 | Kokes et al. |
| 2003/0163587 A1 | 8/2003 | Knight et al. |
| 2004/0024502 A1 | 2/2004 | Squires et al. |
| 2004/0044454 A1 | 3/2004 | Ross et al. |
| 2004/0054503 A1 | 3/2004 | Namaky |
| 2004/0093134 A1 | 5/2004 | Barber et al. |
| 2004/0128071 A1 | 7/2004 | Schradi |
| 2004/0172177 A1* | 9/2004 | Nagai et al. ................ 701/29 |
| 2004/0194479 A1 | 10/2004 | Umebayashi et al. |
| 2004/0218894 A1 | 11/2004 | Harville et al. |
| 2005/0090939 A1 | 4/2005 | Mills et al. |
| 2005/0096020 A1 | 5/2005 | Oesterling |
| 2005/0097541 A1 | 5/2005 | Holland |
| 2005/0192724 A1 | 9/2005 | Hendry |
| 2005/0281414 A1 | 12/2005 | Simon et al. |
| 2006/0034231 A1 | 2/2006 | Tailor et al. |
| 2006/0041348 A1 | 2/2006 | Liebl et al. |
| 2006/0130033 A1 | 6/2006 | Stoffels et al. |
| 2006/0132291 A1 | 6/2006 | Dourney, Jr. et al. |
| 2006/0155437 A1 | 7/2006 | Wang et al. |
| 2006/0229777 A1 | 10/2006 | Hudson et al. |
| 2006/0253235 A1 | 11/2006 | Bi et al. |
| 2007/0121959 A1 | 5/2007 | Philipp |
| 2007/0162796 A1 | 7/2007 | Chan et al. |
| 2007/0171029 A1 | 7/2007 | Inbarajan |
| 2007/0179799 A1 | 8/2007 | Laghrari |
| 2008/0015748 A1 | 1/2008 | Nagy |
| 2008/0027605 A1 | 1/2008 | Oesterling |
| 2008/0027606 A1 | 1/2008 | Helm |
| 2008/0082226 A1 | 4/2008 | Amador et al. |
| 2008/0140281 A1 | 6/2008 | Morris et al. |
| 2008/0147267 A1 | 6/2008 | Plante et al. |
| 2008/0162033 A1 | 7/2008 | Wagner et al. |
| 2008/0167056 A1 | 7/2008 | Gilzean et al. |
| 2008/0167078 A1 | 7/2008 | Eibye |
| 2008/0172357 A1 | 7/2008 | Rechis et al. |
| 2008/0216067 A1 | 9/2008 | Viling |
| 2008/0269975 A1 | 10/2008 | Bertosa et al. |
| 2009/0063038 A1 | 3/2009 | Shrivathsan et al. |
| 2009/0063045 A1 | 3/2009 | Figueroa et al. |
| 2009/0143937 A1 | 6/2009 | Craig |
| 2009/0177352 A1 | 7/2009 | Grau et al. |
| 2009/0210145 A1 | 8/2009 | Amano |
| 2009/0276115 A1* | 11/2009 | Chen ........................ 701/32 |
| 2009/0292416 A1 | 11/2009 | Ubik et al. |
| 2009/0308134 A1 | 12/2009 | Pepper |
| 2009/0326757 A1* | 12/2009 | Andreasen et al. ........... 701/32 |
| 2009/0326991 A1 | 12/2009 | Wei et al. |
| 2010/0042287 A1 | 2/2010 | Zhang et al. |
| 2010/0042288 A1* | 2/2010 | Lipscomb et al. ............ 701/33 |
| 2010/0056055 A1 | 3/2010 | Ketari |
| 2010/0204878 A1 | 8/2010 | Drew et al. |
| 2010/0245123 A1 | 9/2010 | Prasad et al. |
| 2010/0246846 A1 | 9/2010 | Burge et al. |
| 2010/0256861 A1 | 10/2010 | Hodges |
| 2010/0262335 A1* | 10/2010 | Brozovich ................... 701/33 |
| 2011/0022422 A1 | 1/2011 | Taylor |
| 2011/0041088 A1 | 2/2011 | Mason et al. |
| 2011/0046883 A1 | 2/2011 | Ross et al. |
| 2011/0190962 A1 | 8/2011 | Peterson et al. |
| 2011/0225096 A1* | 9/2011 | Cho et al. ................... 705/305 |
| 2011/0258044 A1* | 10/2011 | Kargupta ................... 705/14.49 |
| 2011/0276218 A1 | 11/2011 | Dwan et al. |
| 2011/0276219 A1 | 11/2011 | Swaminathan et al. |
| 2012/0029762 A1 | 2/2012 | Ubik et al. |
| 2012/0030512 A1 | 2/2012 | Wadhwa et al. |
| 2012/0053782 A1 | 3/2012 | Gwozdek et al. |
| 2012/0072055 A1 | 3/2012 | Barlsen et al. |
| 2012/0075092 A1* | 3/2012 | Petite et al. ................ 340/539.1 |
| 2012/0294238 A1 | 11/2012 | Uhler |

OTHER PUBLICATIONS

Ford Motor Company, "Navigation System: SYNC," Owner's Guide Supplement, SYNC Version 1 (Jul. 2007).

Ford Motor Company, "SYNC," Owner's Guide Supplement, SYNC Version 1 (Nov. 2007).

Ford Motor Company, "Navigation System: SYNC," Owner's Guide Supplement, SYNC Version 2 (Oct. 2008).

Ford Motor Company, "Navigation System: SYNC," Owner's Guide Supplement, SYNC Version 3 (Jul. 2009).

Ford Motor Company, "SYNC," Owner's Guide Supplement, SYNC Version 3 (Aug. 2009).

DrewTech gets you on the Bus, article printed from www.drewtech.com, Dec. 16, 2009.

Software, Pass Thru Pro II, J2534 Flash Reprogramming, printed from buy1.snapon.com, Dec. 3, 2009.

Introduction to J2534 and Flash Reprogramming, Drew Technologies, Copyright 2009.

Ford Motor Company, "SYNC," Owner's Guide Supplement, SYNC Version 2 (Oct. 2008).

\* cited by examiner

APPARATUS, METHODS, AND SYSTEMS FOR TESTING CONNECTED SERVICES IN A VEHICLE

BACKGROUND

1. Technical Field

Various embodiments relate to testing connected service in a vehicle.

2. Background Art

Various tools exist in the art for diagnostic vehicle services. For example, U.S. Pat. No. 7,590,476 to Shumate discloses a vehicle diagnosis system and method. Vehicle faults are diagnosed by receiving information on a vehicle from a customer regarding an actual vehicle fault and accessing data regarding the actual vehicle fault from the vehicle. A diagnostic program is initiated based on identifying vehicle information, the information received from the customer, and the data accessed from the vehicle. A specific vehicle system is selected for diagnosis and includes a particular vehicle component that may be associated with the actual vehicle fault. A list of diagnostic program results is received that defines multiple probable vehicle component faults for the specific vehicle system that may be associated with the actual vehicle fault. A determination on how to proceed with correcting the actual vehicle fault is made based on the list of diagnostic program results that define multiple probable vehicle component faults. A probable vehicle component fault is selected to evaluate whether it is the source of the actual vehicle fault.

SUMMARY

One aspect includes a diagnostic system for diagnosing one or more connected services in a vehicle. The system may include at least one connected services diagnostic computer (e.g., and without limitation, a handheld computer) which may include diagnostic software for diagnosing one or more connected services of a vehicle. The connected services may include, but is not limited to, at least one of a WiFi service, a BLUETOOTH service, a storage media service, an in-vehicle memory card reader service, and an audio service.

The diagnostic computer may be configured to establish wired and/or wireless communication with a vehicle computing system in the vehicle. The computer may be further configured to establish a diagnostic connection (which may be a wireless connection) to a diagnostics server. Vehicle information and diagnostic data from the one or more connected services may be received from the vehicle computing system. The vehicle information and the diagnostic data may be transmitted via the diagnostic connection to the diagnostics server. A connected services diagnostic status may be determined for the vehicle based on the vehicle information and the diagnostic data. The connected services diagnostic status may be received from the server via the diagnostic connection and output to a user.

In one embodiment, the connected services diagnostic status may be based on diagnostic information stored in a diagnostics database.

Another aspect includes a computer program product for diagnosing one or more connected services in a vehicle. The computer program product may be embodied in a computer readable medium and have computer readable instructions for establishing communication with a vehicle computing system in the vehicle. Additional instructions may be for establishing a diagnostic connection to a diagnostics server. Vehicle information and diagnostic data from the one or more connected services may be received from the vehicle computing system and transmitted via the diagnostic connection to the diagnostics server. A connected services diagnostic status may be determined for the vehicle based on the vehicle information and the diagnostic data. The connected services diagnostic status may be received from the server via the diagnostic connection and output to a user.

In one embodiment, the connected services diagnostic status may be a pass/fail status. The output may further include a cause and location of a connected services failure if the diagnostic status is a fail status.

Another aspect includes a method for diagnosing one or more connected services in a vehicle. Vehicle and diagnostic communication may be established via a vehicle connection and a diagnostic connection, respectively. Vehicle information and connected services diagnostic data for a vehicle may be received via the vehicle connection and transmitted via the diagnostic connection to a server. A connected services diagnostic status may be determined using the vehicle information and the diagnostic data. A diagnostic status may be received and output to a user.

In one embodiment, the vehicle information may be used to identify a vehicle and the diagnostic data may be used to determine the diagnostic status from a diagnostic database. The vehicle information may be a vehicle identification number (VIN).

In additional embodiments, the output may be received on a handheld computer on which one or more LED lights are illuminated to signify the diagnostic status.

These and other aspects of the present invention will be better understood in view of the attached drawings and following detailed description of the invention.

BRIEF DESCRIPTION OF THE DRAWINGS

The figures identified below are illustrative of some embodiments of the present invention. The figures are not intended to be limiting of the invention recited in the appended claims. Embodiments of the present invention, both as to their organization and manner of operation, together with further object and advantages thereof, may best be understood with reference to the following description, taken in connection with the accompanying drawings, in which:

DETAILED DESCRIPTION

Detailed embodiments of the present invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

Figure 1:
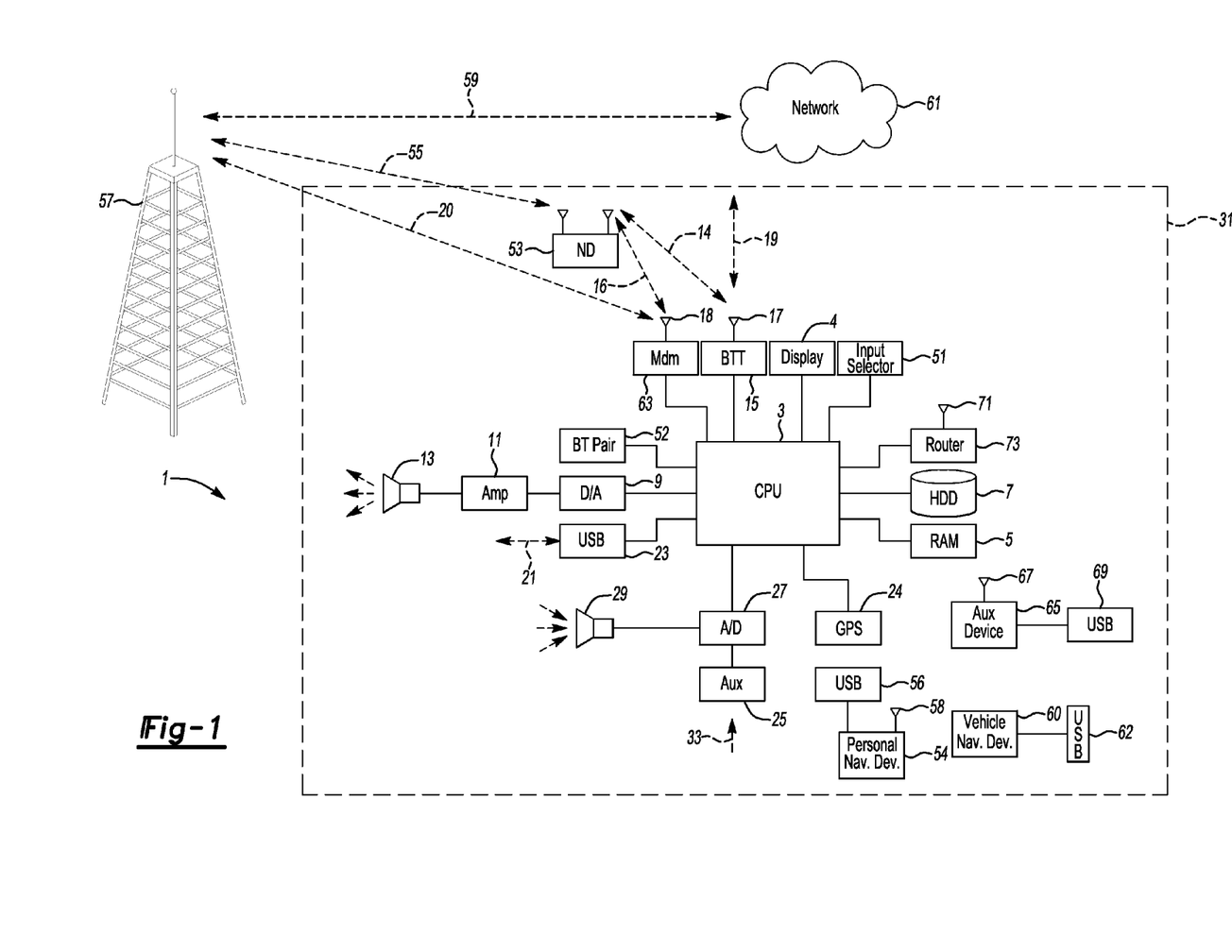
FIG. 1 is an illustration of the system architecture of a vehicle computing system according to one of the various embodiments.

FIG. 1 illustrates an example block topology for a vehicle based computing system 1 for a vehicle 31. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone 29 and the auxiliary connector 25 may be converted from analog to digital by a converter 27 before being passed to the processor.

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, etc.). The nomadic device (ND) can then be used to communicate 59 with a network 61 outside the vehicle 31 through, for example, communication 55 with a cellular tower 57.

Exemplary communication between the nomadic device and the BLUETOOTH Transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device).

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (e.g., and without limitation, modem 63) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61.

Further, the CPU could be in communication with a variety of other auxiliary devices 65. These devices can be connected through a wireless 67 or wired 69 connection. Also, or alternatively, the CPU could be connected to a vehicle based wireless router 73, using for example a WiFi 71 transceiver. This could allow the CPU to connect to remote networks in range of the local router 73.

Figure 2A:
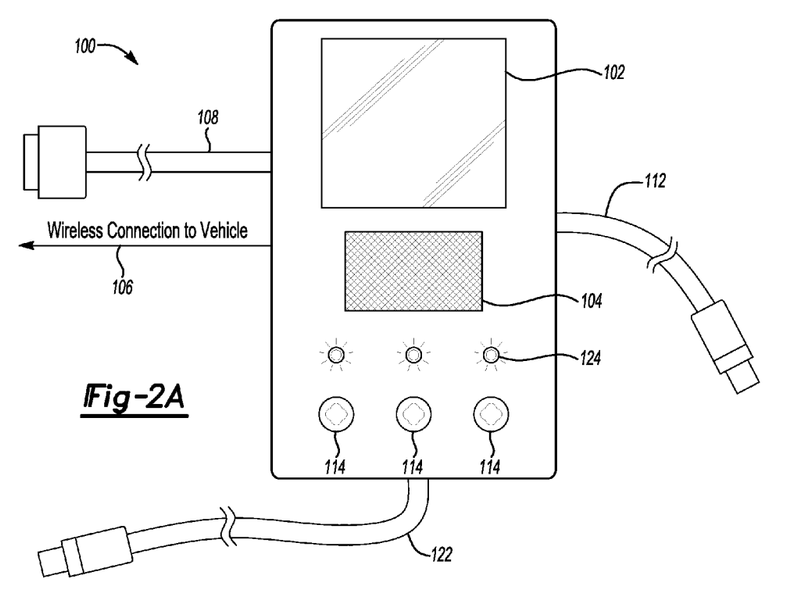
FIG. 2A illustrates one embodiment of a connected service test tool for testing wireless functions in a vehicle.
Figure 2B:
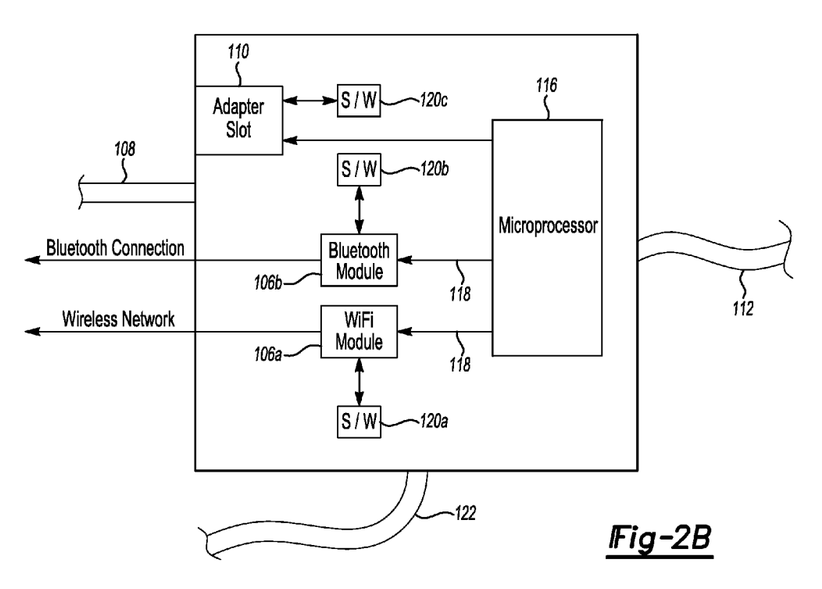
FIG. 2B is a dissected view of the connected services test tool shown in FIG. 2A according to one of the various embodiments.

FIGS. 2A and 2B show a tool for testing and diagnosing one or more connected services in a vehicle. FIG. 2B is a dissected view of the tool shown in FIG. 2A. It will be appreciated that the architecture and arrangement of the components in FIGS. 2A and 2B are non-limiting. The arrangement of parts may be modified without departing from the one or more embodiments of the invention. Furthermore, those of skill in the art will appreciate that the external configuration of tool 100 is not limited to the particular configuration illustrated in FIGS. 2A and 2B as described above. A multitude of different shapes and configurations may be implemented. For example, the test tool 100 may be implemented in software running on a portable computing device, such as a laptop computer, handheld computer or other mobile computing device. Alternatively or additionally, the tool may be a web-based tool. The shape and physical configuration of the tool illustrated in FIGS. 2A and 2B should not be construed as a limitation of the present invention.

The features of tool 100, as described below, may or may not be integrated as part of a tool for testing one or more communication channel inputs to a vehicle computing system. One such tool is described in application Ser. No. 12/126,624 entitled, "Apparatus and Method for Remotely Testing Multiple Communication Channel Inputs to a Vehicle Computer," the contents of which are incorporated herein by reference.

Referring to FIG. 2A, tool 100 may be a handheld or other electronic device having a display 102 for displaying status messages (graphical and/or tactile) to a user. Alternatively, tool 100 may not be a handheld device and may include, for example (and without limitation) a desktop computer or laptop computer. The status messages may pertain to the status of the connected services being tested in the vehicle. It should be understood that "connected services" refers to connections to one or more in-vehicle services (e.g., and without limitation, BLUETOOTH, WiFi, memory card reader, GPS, etc).

In some embodiments, the display 102 may also be used to display video images during video testing. In this non-limiting embodiment, the auxiliary input may be a video input 25 (e.g., and without limitation, an RCA jack) for receiving a video testing cable on tool 100 (not shown).

Connected services that may be tested may include wireless and wired services including, but not limited to, WiFi, WiMax, LAN, WAN, BLUETOOTH, audio sounds, video signals, and memory card and memory card slot functionality. Additional, non-limiting connected services that may be tested include in-vehicle software. As a non-limiting example, in-vehicle software may be tested for connection status, presence of license keys, and software level status (i.e., the amount of downloaded software). A user may seek to diagnose one or more of these connected services in a vehicle using tool 100.

Tool 100 may include a speaker 104 for diagnosing audio sound quality and vehicle speaker complaints. In diagnosing the audio sound, one or more audible sounds may be output from speaker 104 signifying the audio sound's operability or inoperability. The audible diagnostic sounds may include, but are not limited to, one or more tones, beeps, or other alerts. In one non-limiting embodiment, speaker 104 may output an operability result in a spoken language. For example, and without limitation, one or more spoken messages such as "audio is working" may be output.

One or more connectors may be connected to one or more inputs of the vehicle for use in diagnosing one or more connected services. Tool 100 may include both wired and wireless inputs/connections. A wireless input may include input 106. Tool input 106 may wirelessly connect (e.g., and without limitation, via WiFi, WiMax, cellular and/or BLUETOOTH) to vehicle computing system 1 as part of the connected services testing of the wireless components. Based on the connectivity status, the connectivity of the wireless module in the vehicle can be diagnosed. Further details of the wireless input will be described with respect to FIG. 2B.

A wired vehicle input/connection may include input 108. Tool input 108 may be used to diagnose memory card slots in vehicles equipped with a memory card reader. Input 108 may be inserted into a memory card slot in the vehicle and the connectivity status of the memory card reader displayed on display 102 and/or output from speaker 104.

A wired tool input may also include a video diagnostic input (not shown) as described above.

In one embodiment, tool 100 may also include an adapter slot 110 (FIG. 2B) for diagnosing storage media such as (and without limitation) a memory card (e.g., secure digital (SD), compact flash (CF), etc.), a PCMCIA card, or other like media. The adapter slot 110 may be any suitable port for connecting a storage media diagnostic device including, but not limited to, a USB port, a firewire port, serial port, and/or parallel port. In some embodiments, the adapter port 110 may permit the storage media diagnostic devices to be interchanged for diagnosing multiple media. In some further embodiments, adapter slot 110 may receive the storage media directly. As a non-limiting example, a memory card may be inserted into the adapter slot 110 for obtaining a diagnosis of the memory card. In any embodiment, the diagnosis may be output on display 102 and/or audibly from speaker 104.

Figure 3:
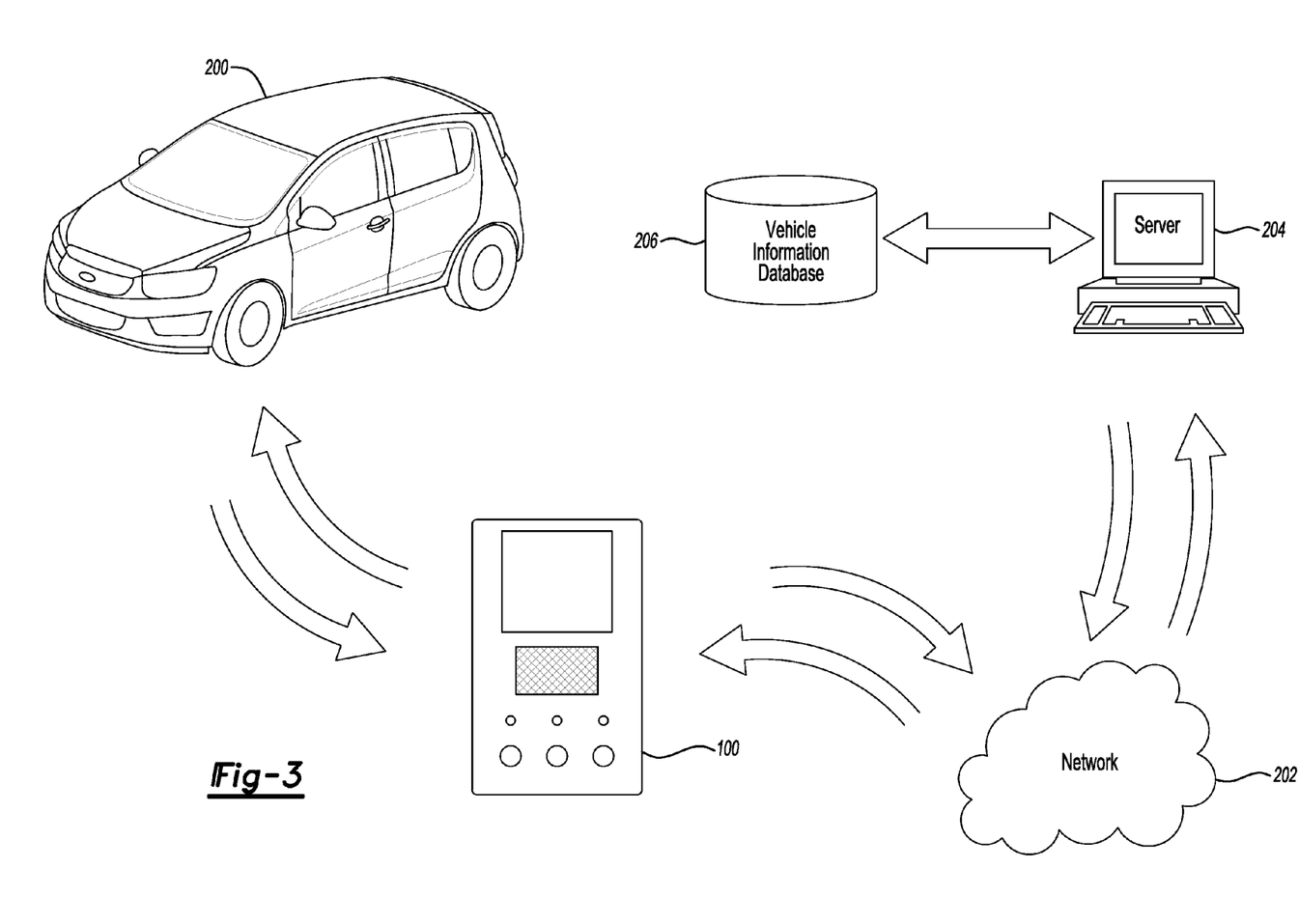
FIG. 3 illustrates a system architecture for obtaining diagnostic information for one or more in-vehicle connected services according to one of the various embodiments.

As will be further described below, a diagnosis of the one or more vehicle modules may be accomplished over a communication network (e.g., and without limitation, the Internet). FIG. 3 illustrates a system architecture for obtaining diagnostic information at tool 100 for one or more connected services in a vehicle. FIG. 3 will be described with respect to FIGS. 2A and 2B.

FIG. 2A illustrates connection 112 of tool 100 which may be a wired connection to the vehicle. Vehicle connector 112 may be, but is not limited to, a USB, serial, or parallel connection. By inserting connection 112 to a vehicle port (e.g., and without limitation, a USB, serial or parallel port), vehicle identification information (such as a vehicle identification number or VIN) may be obtained by tool 100. The VIN may be obtained through a vehicle network, through a lookup process on a vehicle module, through an OBD module, and/or via software installed to the VCS 1. It will be appreciated that vehicle information may be obtained through other tools and those provided are provided as non-limiting examples. The vehicle identification information obtained by the tool 100 may be transmitted to a vehicle information database 206 over a communication network 202.

In one non-limiting embodiment, the communication network may be the Internet. The communication standard(s) for transmitting the vehicle information may include, but are not limited to, cellular, WiFi, and WiMax. Communication network 202 may serve as a diagnostic connection over which information may be transmitted to the server 204 and information from the vehicle information database 206 may be received for determining a diagnostic status of the one or more connected service in the vehicle.

As illustrated in FIG. 3, in one embodiment, the vehicle information database 206 may be hosted or controlled by an OEM or other entity and accessed through server 204. Information obtained from the vehicle (such as, without limitation, VINs) may be transmitted to the OEM backend system 204 via the diagnostic connection (network 202). The vehicle information database 206 may include diagnostic information records on one or more vehicles. Non-limiting examples of vehicle diagnostic information may include information on software/hardware located in a vehicle, information on software downloaded to the vehicle, including license keys and software available for reinstallation of downloaded software, and diagnostic information for the connected services. The one or more information records may be organized according to a vehicle's VIN. Accordingly, the VIN, once obtained from the vehicle, may be transmitted by the tool 100 over network 202 to the database 206 (via server 204) for retrieving vehicle information and transmitted back over network 202 for output from tool 100. Further details of obtaining the diagnostic information will be described below.

Referring back to FIG. 2A, vehicle identification information may also be obtained wirelessly through wireless tool connection 106. Referring to FIG. 2B, which illustrates a dissected view of the tool 100 illustrated in FIG. 2A, tool 100 may include one or more modules for generating a wireless connection. Two non-limiting examples include a WiFi module 106a and/or a BLUETOOTH module 106b. The WiFi module 106a may transmit signals for connecting to wireless router 73. The BLUETOOTH module/transceiver 106b may transmit signals for pairing with vehicle transceiver 15. An example of a BLUETOOOTH module 30 is one manufactured by FREE2MOVE, part number F2M03MLA. It will be appreciated that tool 100 may include one or more additional wireless modules arranged in any combination and these examples are non-limiting and illustrative.

Vehicle identification information (e.g., and without limitation, a VIN) may be obtained via the wireless connection in a similar manner described above with respect to when the tool 100 is connected to the VCS 1 using wired connection 112. A wireless connection 106 may be generated automatically or manually. For example, the connection 106 may be generated once the tool 100 is in the vicinity of the vehicle. Upon making the connection, the vehicle information may be transmitted. Alternatively or additionally, a wireless connection may be generated manually via a selection of one or more of buttons 114. It should be understood that the arrangement of components illustrated in FIGS. 2A and 2B is non-limiting and can be modified and re-arranged without departing from the spirit of the invention.

A user (e.g., and without limitation, a service technician) may manually activate a wireless connection by one or more of buttons 114 (FIG. 2A) when the user is in a range that tool 100 can communicate with VCS 1. In one embodiment, a wireless connection is generated once the tool 100 is in the vicinity of the VCS 1. The user may select one of the button(s) 114 and, upon selection, a signal may be transmitted to microprocessor 116 (FIG. 2B) which is in electrical communication 118 with the one or more wireless modules 106a, 106b. Microprocessor 116 may transmit one or more instructions via an electrical signal to the one or more wireless modules 106a, 106b for generating a wireless connection. In one embodiment, a return signal may be transmitted to the tool 100 confirming that a connection has been established. Upon establishing a connection, the identification information may be transmitted to the vehicle information database 206 for obtaining vehicle information/diagnostic information as described above.

It should be understood that button(s) 114 may be push button(s), graphical buttons (e.g., buttons on a touch screen display), or other button(s). Button(s) 114 may also be used for diagnosing other connections. For example, and without limitation, a user may insert adapter 108 for testing the in-vehicle memory card reader. As another non-limiting example, a diagnostic device may be inserted into adapter slot 110 of the tool 100. Upon insertion, the user may then press one or more of button(s) 114 to begin testing. Signal(s) may be transmitted to and from microprocessor 116 and to and from adapter 108 and/or slot 110 for performing a diagnosis.

Tool 100 may also include diagnostic software for diagnosing one or more connected services. In one embodiment, tool 100 may include software for each connected service module. Thus, the WiFi module 106a may include software 120a for confirming that a wireless connection can be established between the tool 100 and the vehicle. Similarly, the BLUETOOTH module may also include software 120b for confirming that a wireless connection can be established. Additionally, adapter slot 110 may communicate with software 120c for confirming the proper operation of media that is inserted into slot 110 or inserted into a receiving adapter. Additionally or alternatively, the software may be in communication with microprocessor 116 which may send instructions to the software for testing and diagnosing one or more connected services components. In one embodiment, the software may be written to the microprocessor 116 for performing testing and diagnosis. Accordingly, it should be understood that the structure and arrangement for confirming operation of the one or more connected services modules is non-limiting and other structure(s) and arrangement(s) may be utilized as is known in the art.

In one embodiment, tool 100 may also include a data cable 122 (e.g., and without limitation, a USB cable). Data cable 122 may be utilized in order to receive information from a remote source (e.g., the vehicle information database 206) and transfer information to the vehicle. For example, tool 100 may be connected to a personal computer (PC) or other remote terminal (e.g., a nomadic device) for receiving software to download the VCS 1. The tool 100 may receive software from the vehicle information database 206 using the vehicle identification information (e.g., the VIN) received from the vehicle (either via a wired or wireless connection as described above).

In one embodiment, the tool 100 may alternatively or additionally receive applications purchased by a vehicle-owner, and the respective license keys, from a purchased applications site (e.g., a website). In this latter embodiment, the vehicle-owner may have pre-purchased applications for use in the vehicle from the purchased applications website. The purchased applications may be stored at the purchased application site after purchase until the application(s) are downloaded to tool 100. In another embodiment, the purchased applications may be downloaded to the VCS 1 over a network connection (e.g., the Internet) upon purchase, but may not be operable until the license keys have been received. The tool 100 may be used to obtain the license keys from the purchased application website.

The tool 100 may then transfer the downloaded data to the vehicle. The transfer may be accomplished using a wired connection (e.g., via data cable 122) or wirelessly.

Tool 100 may optionally include one or more LED lights 124 for indicating which connected service is being tested/diagnosed (e.g., based on the button that is pressed). One or more diagnostic messages may also be output using the LEDs 124 (in addition to or as an alternative to displaying from display 102 or outputting from speaker 104). For example, if a button 114 is pressed to test a WiFi connection, the resulting status may be output via one or more LED lights 124. The message may be output as one or more light flashes from a corresponding LED, color changes representing the status, or a pattern of flashing and color changes from one or more of the lights 124. It should be understood that these examples are non-limiting and other methods of outputting a message may be utilized.

The status messages (whether output from the display 102, speaker 104 and/or LEDs 124) may be presented as pass or fail. A pass/fail message may be a numeric message (e.g., 1=pass, 0=fail), alphabetic (e.g., A=pass, B=fail), alphanumeric, associated with certain colors, output in a spoken language, and/or displayed as text.

In one embodiment, tool 100 may be a web-based tool. The user may perform the various diagnostics as described above from any remote terminal including, but not limited to, a personal computer or nomadic device (e.g., a mobile phone, PDA, etc). Accordingly, the transfer of data to and from the vehicle (as described above), and the diagnostics, may be a seamless, transparent process to the user.

Figure 4:
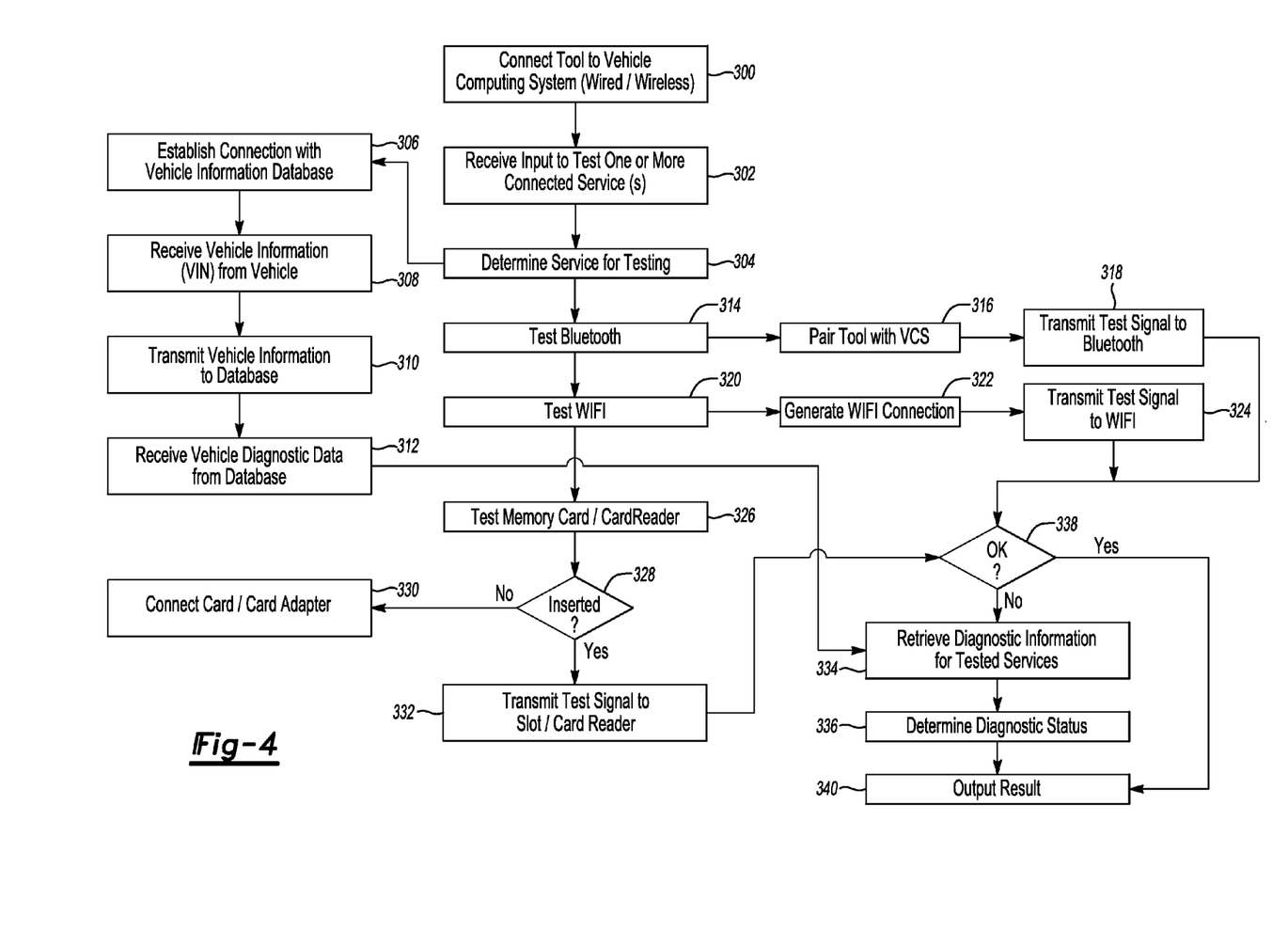
FIG. 4 illustrates one process for testing and diagnosing one or more wireless, connected services in a vehicle according to one of the various embodiments.

FIG. 4 illustrates a process for testing the one or more connected services in a vehicle. It will be appreciated that the disclosure and arrangement of FIG. 4 may be modified or re-arranged to best fit a particular implementation of the various embodiments of the invention. As illustrated in block 300, a wired or wireless connection is made with the vehicle. Proceeding to block 302, one or inputs are received to test one or more connected services. The one or more inputs may be received from the button(s) 114.

One or more services for testing may be determined based on and/or in response to the received input(s) as illustrated in block 304. The one or more connected services may be tested/diagnosed sequentially (in any order) or in parallel. Accordingly, while FIG. 4 illustrates the diagnostic flow as occurring sequentially, this illustration serves as an example and should not be considered non-limiting.

In one embodiment, a diagnostic connection (wired or wireless) to the vehicle information database 206 may also be established, as illustrated in block 306, at or around the same time as the service(s) to be tested are determined (block 304). As described above, the wired connection to the vehicle information database 206 may be generated and established via a connection between data cable 122 and a remote terminal (e.g., PC or nomadic device).

As illustrated in block 308, vehicle identification information may be extracted from the vehicle and received for transmission to the vehicle information database 206. In one embodiment, the vehicle identification information may be received before the connection is established with the vehicle information database 206.

The vehicle identification information may be transmitted to the vehicle information database 206 as illustrated in block 310. The VIN may be used to look up and extract the vehicle data from the vehicle information database 206. The vehicle data may be received from the vehicle information database 206 as illustrated in block 312.

As stated above, vehicle data may include any information about the vehicle. By way of example and not limitation, vehicle diagnostic data may include vehicle diagnostic information, information on connected services available in the vehicle, information on software in the vehicle, test data for testing the one or more connected services, and other information related to the vehicle.

In one embodiment, all vehicle diagnostic data for the vehicle is received by the tool 100 from vehicle information database 206. The data is then parsed by the tool 100 to determine a diagnostic status. In another embodiment, the vehicle data is parsed by the server 204 and the diagnostic status is downloaded by the tool 100 for output to the user. As an example, the data may be parsed to find vehicle diagnostic data that passes and/or fails based on the diagnostic information received from the connected services of the vehicle. The diagnostic information may include, for example (without limitation), diagnostic trouble codes (or other diagnostic testing identifiers) associated with the connected services. With respect to software, it should be understood that software that is not in the vehicle may generate a fail status and software that is in the vehicle may generate a pass status. Other methods of extracting the relevant data may be utilized without departing from the scope and spirit of the invention.

In one embodiment, where a fail status is generated, the diagnostic information in database 206 may also include information on a cause for the fail status. Potential causes for a fail status may include a break in wireless communication (i.e., no data transmission), corrupt software, unreadable media, and/or a malfunction in the memory card reader. It should be understood that these examples are non-limiting. In one embodiment, the diagnostic information in database 206 may be stored as a series of number and/or letters (or in another non-limiting code form) which may be translated by the server 204 and/or tool 100 for comprehension by the user.

Determining which service to test/diagnose may include determining if BLUETOOTH is to be tested as illustrated in block 314. The test may be initiated automatically (e.g., in a sequence programmed to the tool 100) and/or manually (e.g., a button 114 representing a WiFi test is selected). A test signal may be transmitted to the BLUETOOTH module 106b for transmission to the BLUETOOTH transceiver 15 in the vehicle in order to test the BLUETOOTH communication channel as illustrated in block 318. Prior to, or as a part of, transmitting the test signal, the tool 100 may be paired with the BLUETOOTH transceiver 15 in the vehicle 31, as indicated at block 316. Pairing mode is entered at tool 100 by depressing one or more button(s) 114 which may be a BLUETOOTH pair button. The vehicle 31 may also include a BLUETOOTH pairing button 52 which may be also pressed to complete the pairing operation.

During testing, a test message for the BLUETOOTH connection may be transmitted to BLUETOOTH module 106b for wireless communication to the BLUETOOTH transceiver 15 within vehicle 31. The message may be played back at speaker 104 as indicated at block 340. In one embodiment, the result may be in one or more languages including, but not limited to, English, French and Spanish. A message may state, for example, "This is a test of the BLUETOOTH communication channel. Data transmission is successful." Prior to outputting the message, a determination may be made whether the test signal was transmitted successfully as illustrated in block 338. Accordingly, if this message is heard by a user, the BLUETOOTH communication channel is determined to be operational as determined by the message output from the speaker 104. If the message is not heard, the BLUETOOTH service is not operating.

In one embodiment, diagnostic information may be retrieved from the vehicle information database 206 for the BLUETOOTH channel as illustrated in block 334. The diagnostic information may be received by the tool 100 and the diagnostic status may be determined based on the diagnostic information as illustrated in block 336. A non-limiting example of a diagnostic status may be that a paired connection cannot be generated between the tool 100 and the vehicle 31. The status may or may not also include a reason that the tool 100 is unable to establish a paired connection (e.g., and without limitation, software and/or hardware problem). The diagnostic status may be output from the tool 100 and/or output from speaker 104 as illustrated in block 340.

As illustrated in block 320, the WiFi communication channel may also be tested. The test may be initiated automatically (e.g., in a sequence programmed to the tool 100) and/or manually (e.g., a button 114 representing a WiFi test is selected). A WiFi connection may be generated as illustrated in block 322. A test signal may be transmitted to the WiFi module 106a for transmission to the router 73 in the vehicle in order to test the WiFi communication channel as illustrated in block 324. The WiFi connection may be generated prior to, or as a part of, transmitting the test signal. A WiFi connection is entered at tool 100 by depressing one or more button(s) 114 which may be a WiFi button.

During testing, a test message for the WiFi connection may be transmitted to WiFi module 106a for wireless communication to the router 71 within vehicle 31. The message may be played back at speaker 104 as indicated at block 340. In one embodiment, the result may be in one or more languages including, but not limited to, English, French and Spanish. A message may state, for example, "This is a test of the WiFi communication channel. Data transmission is successful." Prior to outputting the message, a determination may be made whether the test signal transmitted successfully as illustrated in block 338. If this message is heard by a user, the WiFi communication channel is determined to be operational as determined by the message output from the speaker 104. If the message is not heard, the WiFi service is not operating.

In one embodiment, diagnostic information may be retrieved from the vehicle information database 206 for the WiFi communication channel as illustrated in block 334. The diagnostic information may be received by the tool 100 and the diagnostic status may be determined based on the diagnostic information as illustrated in block 336. A non-limiting example of a diagnostic status may be that a WiFi connection cannot be generated between the tool 100 and the vehicle 31. The status may or may not also include a reason that the tool 100 is unable to connect (e.g., and without limitation, software and/or hardware problem). The diagnostic status may be output from the tool 100 and/or output from speaker 104 as illustrated in block 340.

Storage media and/or an in-vehicle memory card reader may also be tested as illustrated in block 326. Tool 100 may test storage media (e.g., a memory card as illustrated in FIG. 4) inserted into slot 110 and/or test a memory card reader in vehicle 31. The test may be initiated automatically (e.g., in a sequence programmed to the tool 100) and/or manually (e.g., a button 114 representing a WiFi test is selected). A determination may be made whether the adapter port 110 has received a storage media adapter and/or the memory card reader adapter 108 has been inserted as illustrated in block 328. If not, the user may be required to do so as illustrated in block 330. In one embodiment, a message may be transmitted to the user instructing the user to insert an adapter to adapter port 110 and/or adapter 108. The message may be, without limitation, textual (e.g., displayed at display 102), verbal, a tone, a beep, or combinations thereof. Alternatively or additionally, the tool 100 may suspend testing until the adapter is received at adapter port 110 and/or adapter 108 is inserted. In one embodiment, as described below, the insertion status may be determined during testing.

A test signal may be transmitted to the memory adapter slot 110 and/or the in-vehicle memory card reader as illustrated in block 332. A test of the memory card and/or the memory card reader may be performed by pressing button(s) 114 which may activate such testing.

During testing, a test message may be played back at speaker 104, as indicated at block 340, identifying the test result. In one embodiment, the result may be in one or more languages including, but not limited to, English, French and Spanish. A message may state, for example, "This is a test of the memory card. Data transmission is successful." A similar message may be output for testing the in-vehicle memory card reader. Prior to outputting the message, a determination may be made whether the test signal transmitted successfully as illustrated in block 338. If this message is heard by a user, the storage media/in-vehicle card reader is determined to be operational as determined by the message output from the speaker 104. If the message is not heard, the storage media/in-vehicle card reader is not operating.

In one embodiment, diagnostic information may be retrieved from the vehicle information database 206 for the storage media/in-vehicle card reader as illustrated in block 334. The diagnostic information may be received by the tool 100 and the diagnostic status may be determined based on the diagnostic information as illustrated in block 336. A non-limiting example of a diagnostic status may be that data cannot be read on the memory card. The status may or may not also include a reason that the tool 100 is unable to read the memory card (e.g., and without limitation, software and/or hardware problem). As another non-limiting example, the status may relate to the memory card reader in the vehicle 31. As another non-limiting example, the status may be that a memory card and/or card reader adapter is not connected. The diagnostic status may be output from the tool 100 and/or output from speaker 104 as illustrated in block 340.

It should be understood that the arrangement of FIG. 4 is illustrative and should not be considered limiting. For example, the connected services may be tested in any order and/or may be tested sequentially or in parallel. Additionally, other connected services components may be tested including, but not limited to, testing audio sound quality and/or speakers, GPS, and/or software applications installed to the VCS 1 in vehicle 31. In testing software applications, tool 100 may test for the presence of applications purchased and/or installed by the vehicle owner and/or the presence of license keys for the installed applications. By communicating with the vehicle information database 206 (as illustrated in FIG. 4), tool 100 may determine the status of the purchased software and, if necessary, correct any software issues. For example, and without limitation, if any purchased application is missing a license key, tool 100 may retrieve the appropriate license key for installation to VCS 1. As another non-limiting example, if a purchased application is missing or not functioning, tool 100 may retrieve the software for re-installation to VCS 1.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A system comprising:
 a wireless services diagnostic computer comprising diagnostic software for diagnosing vehicle wireless services and being configured to:
  establish communication with a vehicle computing system (VCS);
  establish a diagnostic connection to a diagnostics server;
  receive vehicle information and wireless services diagnostic data from the VCS;
   transmit the vehicle information and the diagnostic data to the diagnostics server;
  receive connected wireless services diagnostic status from the server; and
  output the wireless services diagnostic status.

2. The system of claim 1 wherein the wireless services include at least one of a WiFi service or a BLUETOOTH service.

3. The system of claim 1 further comprising a diagnostics database communicating with the diagnostics server, the diagnostics database having diagnostic information for determining the connected services diagnostic status.

4. The system of claim 3 wherein the server is configured to:
 receive a query of the diagnostics database using the vehicle information and the diagnostic data;
 receive from the diagnostics database the diagnostic information for the vehicle based on the query;
 generate a diagnostic status based on the diagnostic information; and
 transmit the wireless services diagnostic status to the wireless services diagnostic computer.

5. The system of claim 1 wherein the diagnostic connection is a wireless connection.

6. The system of claim 5 wherein the wireless connection includes at least one of a cellular, WiFi and WiMax connection.

7. The system of claim 1 wherein the communication with the vehicle computing system is wired, wireless, or both.

8. The system of claim 7 wherein the wired connection includes a serial, parallel, or USB connection.

9. The system of claim 7 wherein the wireless connection is at least one of a WiFi, WiMax, or Bluetooth wireless connection.

10. The system of claim 1 wherein the connected services diagnostic computer is a handheld computer.

11. The system of claim 10 wherein the handheld computer has at least one of a display and one or more speakers from which the wireless services diagnostic status is output.

12. A non-transitory computer program product being embodied in a computer readable medium and having computer readable instructions for:
    establishing communication with a vehicle computing system in the vehicle;
    establishing a diagnostic connection to a diagnostics server;
    receiving from the vehicle computing system (1) vehicle information and (2) diagnostic data from one or more wireless services;
    transmitting the vehicle information and the diagnostic data via the diagnostic connection to the diagnostics server to determine a wireless services diagnostic status for the vehicle based on the vehicle information and the diagnostic data;
    receiving the wireless services diagnostic status via the diagnostic connection from the server; and
    outputting the wireless services diagnostic status to a user.

13. The computer program product of claim 12 wherein the instructions for outputting the wireless services diagnostic status further includes instructions for outputting a pass/fail status.

14. The computer program product of claim 13 further comprising instructions for outputting an identification of a cause of a wireless services failure if the diagnostic status is a fail status.

15. The computer program product of claim 14 further comprising instructions for outputting a location of the failure among the one or more wireless services.

16. The computer program product of claim 12 wherein the communication with the vehicle communication system and the diagnostic connection is wireless or wired.

17. A method comprising:
    establishing communication between a diagnostic tool, a vehicle and a diagnostic server;
    instructing a wireless services diagnostics test on a wireless vehicle service;
    receiving vehicle information and wireless service diagnostic data from the vehicle based on the instructed test;
    transmitting the vehicle information and the diagnostic data to the server;
    receiving a wireless services diagnostic status from the server indicating functionality of one or more wireless systems; and
    outputting the diagnostic status.

18. The method of claim 17 wherein the wireless service includes a WiFi connection service.

19. The method of claim 17 wherein the wireless service includes a Bluetooth connection service.

20. The method of claim 17 wherein the test includes attempting to establish a wireless connection between the diagnostic tool and a vehicle computer over the wireless vehicle service to be tested.

* * * * *